United States Patent [19]

Nepote

[11] 3,771,740
[45] Nov. 13, 1973

[54] FISHING REEL
[75] Inventor: Alain Robert Nepote, Cluses, France
[73] Assignee: Etablissements Carpano & Pons S.A., Cluses, France
[22] Filed: June 9, 1972
[21] Appl. No.: 261,262

[30] Foreign Application Priority Data
June 11, 1971  France .............................. 7121321

[52] U.S. Cl. ............................................ 242/84.2 A
[51] Int. Cl. ........................................... A01k 89/00
[58] Field of Search ................. 242/84.2 A, 84.21 A

[56] References Cited
UNITED STATES PATENTS
3,054,571  9/1962  Most .............................. 242/84.2 A
2,903,201  9/1959  Sarah ............................. 242/84.2 A
3,123,318  3/1964  Wood ............................. 242/84.2 A Primary Examiner—Billy S. Taylor
Attorney—Robert E. Burns et al.

[57] ABSTRACT

In spin casting fishing reel, a winding cup is axially slidably mounted at the forward end of an axially movable driving shaft, but locked for rotation therewith, with a spring urging the winding cup to an outer position away from the end of the shaft, in which position a line pickup is held by a shoulder on the shaft in a line winding position protruding from the winding cup. When, for casting, the shaft is moved axially forwards, the winding cup is axially stopped by abutment against an exterior nose cone, and by further moving forward the shaft the shoulder moves towards the winding cup, and the pickup withdraws and locks the shoulder/winding cup in this position. When the shaft is returned to its rear position, the winding cup moves rearwardly leaving ample space between the cup and cone for outlet of line from a spool. Upon rotation of the shaft, a cam returns the pickup to its winding position and frees the winding cup which moves forward under the action of the spring.

4 Claims, 6 Drawing Figures

FISHING REEL

BACKGROUND OF THE INVENTION

The invention relates to fishing reels of the type known as spin casting reels.

Spin casting reels generally comprise a frame, a fixed spool disposed along an axis parallel to that of the fishing line, and a fixed outer cover or nose cone having a central forward orifice for the outlet and inlet of line. A lateral handle enables a shaft concentrically mounted within the spool to be driven by means of a gear train, this shaft being integral with a winding cup disposed inside the nose cone. A line pickup in the form of a finger is radially slidably mounted on the cup and is made to protrude outwardly therefrom when the line has to be reeled in, so that when the handle is turned the line engages with the pickup and is wound onto the spool. During casting, the cup is made to move axially forwardly, generally by actuation of a push button or trigger at the rear of the frame, so as to pinch the line between the outer surface of the cup and the inner surface of the nose cone, after the pickup has been withdrawn inside the cup. Upon releasing the cup, the line is freed and can freely escape between the cup and the inside of the nose cone. Rotation of the handle actuates means for outwardly moving the pickup to its protruding position to enable reeling in of the line.

Known reels of this type have several drawbacks. Firstly, when the angler, before casting, acts on the push button, he firstly actuates the pickup withdrawal mechanism. Only by continuing to act on the push button does the cup move forward and grip the line between the cup and nose cone. During these two phases, the line which is not retained by the pickup is free and may unwind from the spool. However, skilful anglers prefer to accurately adjust the length of line extending from the rod prior to casting, so as to ensure a precise cast. Any unwanted modification of this length, such as that mentioned, is therefore detrimental to the precision of casting.

Moreover, the pressure of the angler's finger on the push button is fully transmitted to the winding cup pressing the line against the nose cone. If the pressure exerted is excessive, the line is squashed and may be damaged. When the push button is released, the winding cup moves back to allow the line to slide out, but the space provided at this moment between the edge of the winding cup and the inner wall of the nose cone is insufficient to allow an unimpeded "easy" outlet of line, which makes long casts impossible.

Also, in known spin casting reels, during reeling in of the line, the element carrying the pickup is held in its outer position by bearing against a fixed member, which causes a friction leading to a non-negligeable increase in the resistance to rotation of the handle, and rapidly leads to wear of the contacting surfaces.

In addition, the fixed spool of certain known reels is generally mounted on a central sleeve fixed to the frame. The spool is prevented from rotating by known means such as embossments, notches and/or channels, and is prevented from moving axially by a removable member such as a screw screwed into the central sleeve, or a spring clip. Such removable elements are well known to be a source of nuisance for anglers, since they are all too easily lost whenever it proves necessary to dismantle a reel, especially during a fishing outing.

OBJECTS OF THE INVENTION

It is therefore a general object of the invention to provide a spin casting reel which does not suffer from the above indicated drawbacks.

One object is to provide a spin casting reel in which a pressure of the angler's finger on the push button actuates retraction of the pickup, and therefore freeing of the line, only after the line has been pinched between the edge of the winding cup and the inner wall of the nose cone, and which therefore enables the angler to precisely set the length of line extending from the rod for casting.

Another object is to provide a spin casting reel in which during reeling in of the line, the pickup carrying element rests on a member which rotates therewith, so that there is no relative movement between the bearing surfaces and therefore no unwanted friction or wear at this location.

A further object is to provide a spin casting reel in which the pickup carrying element is positioned such that when, during casting, the angler releases the pushbutton, the winding cup moves rearwardly by a relatively substantial amount to create a relatively large gap between the winding cup and the nose cone so as to ease the outlet of line as much as possible.

A yet further object is to provide a spinning reel in which the spool is molded in one piece with a metallic sleeve having a threaded end screwed into a tapped aperture in the frame, so that assembly is facilitated, and accessory securing means are not required.

DESCRIPTION OF A PREFERRED EMBODIMENT

Figure 1:
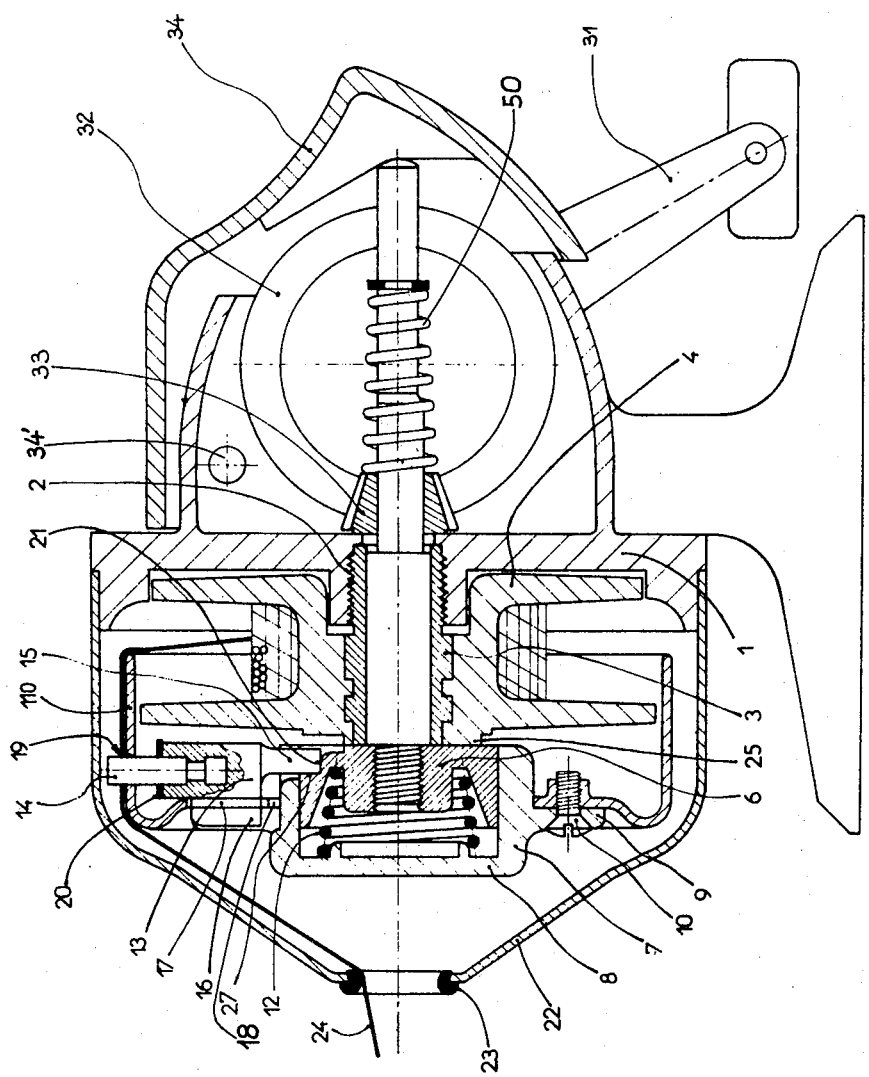
FIG. 1 is a schematic axial cross-section of a spinning reel according to the invention.
Figure 2:
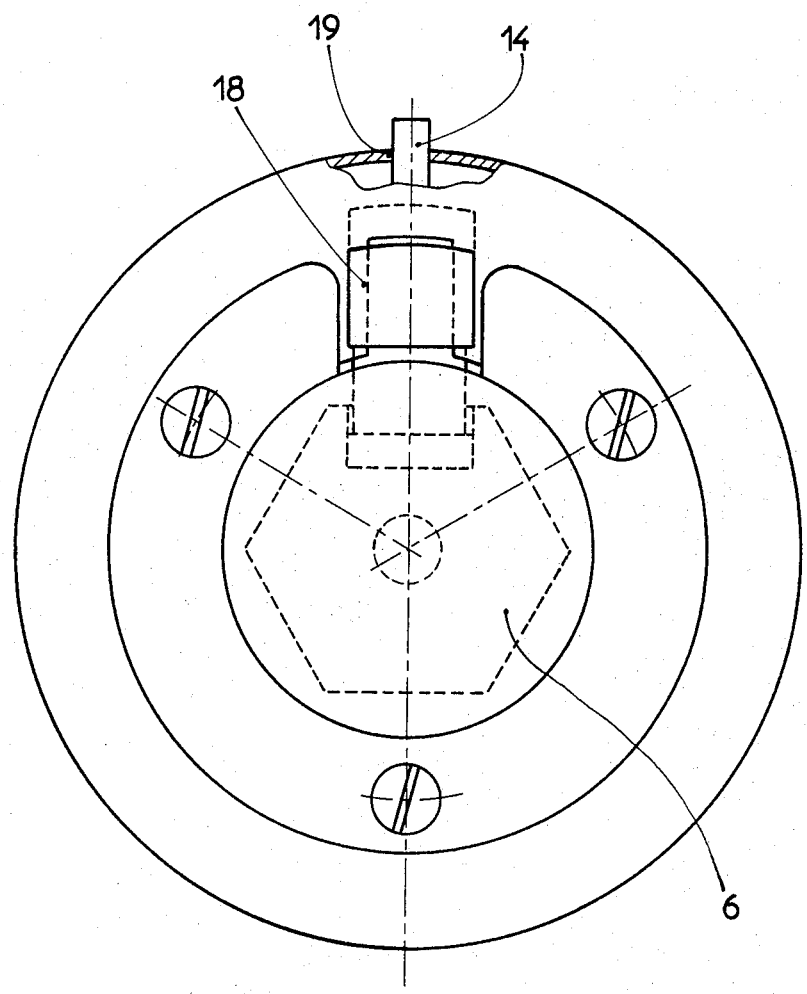
FIG. 2 is a schematic end elevational view taken looking from the left of FIG. 1, with the nose cone and line removed, and the winding cup partly cut away and partly shown in cross-section.

With reference to FIGS. 1 and 2, the illustrated embodiment of fishing reel according to the invention comprises a frame 1 having an axial internally threaded bore 2 in which is firmly screwed a metal sleeve 3 having a spool 4 in plastic material integral therewith, the spool having been molded over the sleeve so as to form a single piece. The outer face of the spool 4, i.e., at the left of FIG. 1, carries an eccentric shoulder 25, including one or more cam-forming bosses, one of which can be seen on FIG. 1, for a purpose which will become apparent further on.

The sleeve 3 is cylindrically axially bored and forms a bearing for a shaft 5 which can be rotated by means of a handle 31 and a gear train 32, 33 disposed towards a rear end of the shaft. The shaft 5 may also be axially moved along the direction of arrow F1 (FIG. 3) against the action of a spring 50 by means of a push button 34, pivotally mounted on the rear of frame 1 about a transverse pin 34'.

Shaft 5 is threaded at its forward end so as to threadably receive a shoulder piece in the form of a nut 6 having a hexagonal outer form, as is visible in FIG. 2.

About this hexagonal nut is mounted a cap or head consisting of a flat circular front 8 and a skirt 7 having a cylindrical outer section and a hexagonal inner section fitting closely over the nut 6 so as to be angularly locked with the nut 6 but free for relative axial movement. The skirt 7 carries a circular flange 9 provided with three holes receiving screws 10 by means of which a winding cup 110 is fixed concentrically with the spool 4, said cup 110 including a cylindrical skirt partially surrounding the spool 4. A compression spring 12 is lodged in a housing formed between the inner faces of front 8 and a forward end of a recess in nut 6.

A pickup carrier 13 of plastic material is radially slidably mounted on the cup 110, but fixed for rotation therewith, and carries an outwardly protruding pickup 14 in the form of a metallic pin, in a very hard, wear and friction resistant material such as polished tungsten carbide, about which the carrier 13 is molded.

Figure 5:
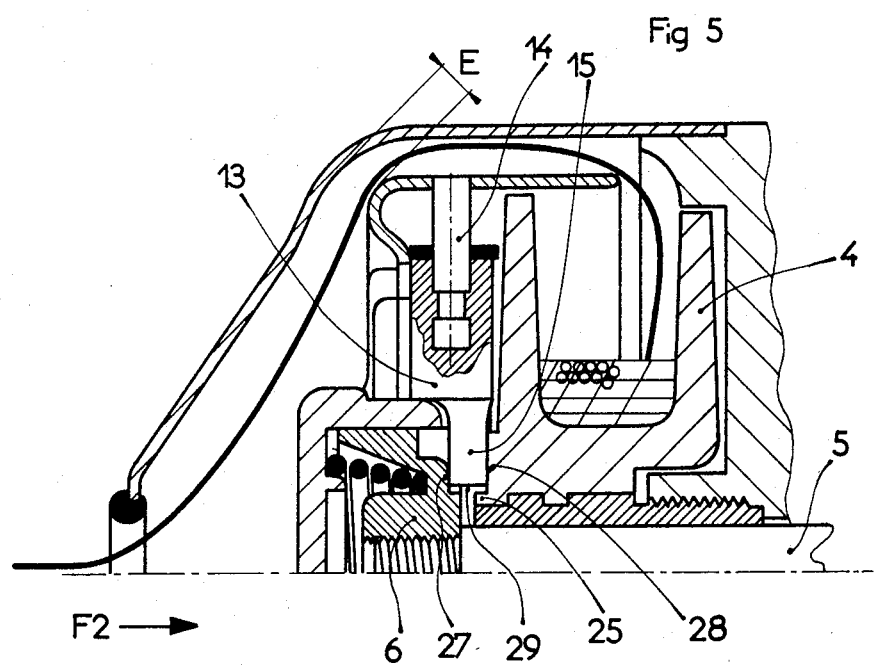
Figure 6:
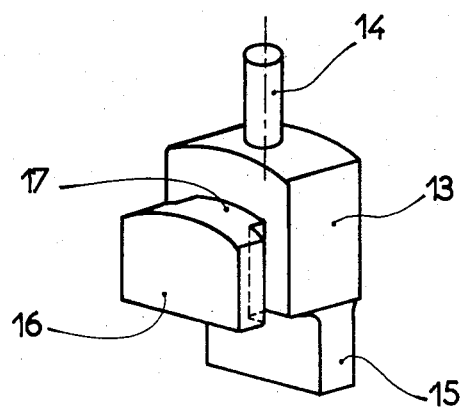
FIG. 6 is a perspective view of the line pickup.

As shown in FIG. 6, carrier 13 includes a main body portion in which the pickup 14 is embedded, a lower flat tongue 15, and a forward protrusion 16 with a narrowed neck portion 17 having parallel edges. The cup 110 has a radially directed opening 18 in which the neck 17 of the carrier can be inserted and is free to slide radially. The pickup 14 passes freely through a cylindrical bore 19 in the skirt of cup 110, and can move between an outermost position (FIGS. 1 and 3) in which it protrudes beyond the skirt of cup 110 and a withdrawn position (FIGS. 4 and 5) in which its outer end lies flush with the outer surface of the skirt of cup 110. A blade spring 20 is provided to permanently urge the pickup 14 inwardly towards its withdrawn position. As shown in FIG. 1, the carrier 13 is held in its outermost position by abutment of tongue 15 in a flat-bottomed notch 21 provided in the nut 6.

The mechanism is covered by a nose cone 22 fitted on the frame 1, the nose cone 22 including a circular central orifice provided with a bead 23 for the passage of line 24, to or from the spool 4, as is well known.

The described reel operates as follows:

FIG. 1 shows the reel in position for rewinding line 24 onto the spool 4, rotation of the handle 31 causing driving of the shaft 5, nut 6 and winding cup 110. The pickup 14 is in its outermost position and engages with the line 24 to wind it on the spool 4.

During this operation, the shaft 5, nut 6, pickup carrier 13 and cup 110 all turn together; there is thus no friction between these components and therefore no braking effect and no wear, which is not observed in prior reels.

Figure 3:
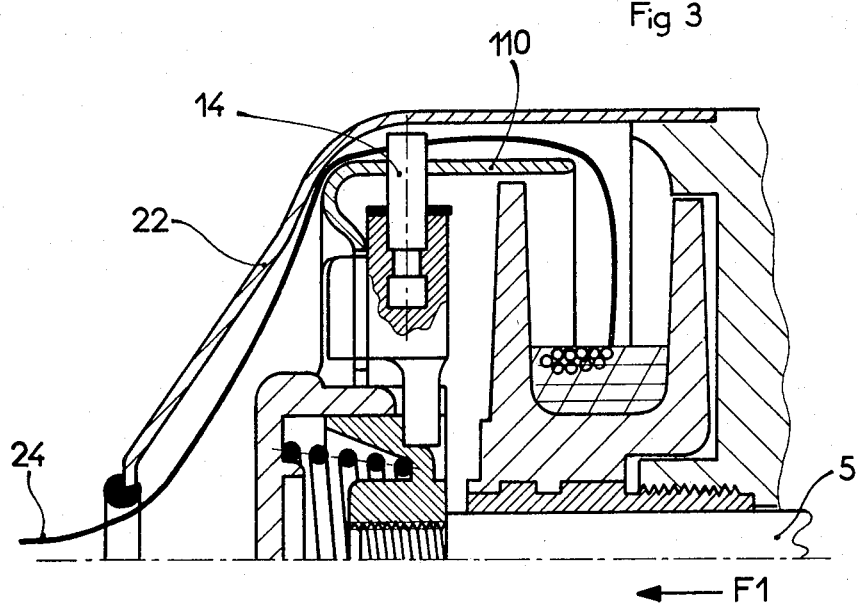
FIGS. 3, 4 and 5 are partial cross-sections of the forward part of the reel shown in successive positions during operation.
Figure 4:
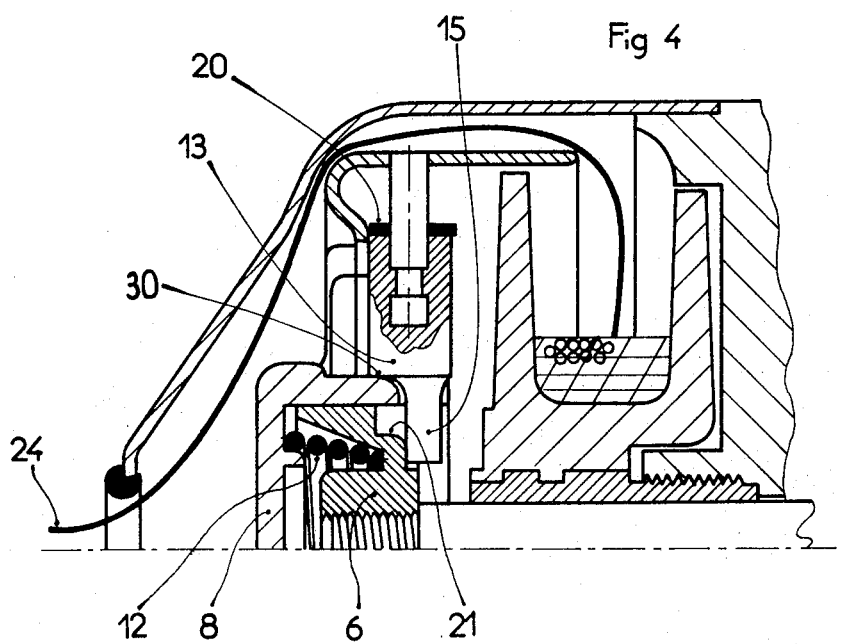

FIGS. 3, 4 and 5 show the sequence of operations when the angler casts the line. By actuation of push button 34, the shaft 5 is moved axially forwardly as shown by arrow F1 (FIG. 3), the nut 6, pickup carrier 13 and cup 110 also moving forward until the edge of the cup 110 comes to bear against the inner wall of cone 22. The line 24 is thus pinched between the cup 110 and cone 22; and cup 110, pickup support 13, and head 7/8 are axially stopped against further forward movement.

If pressure on the push button 34 is accentuated, the nut 6 moves forwardly in the skirt 7 of the head 7/8 thereby compressing spring 12, as shown in FIG. 4. Any excess pressure exerted by the angler on the push button 34 is thus not detrimental to the line, since this pressure is always only transmitted to the line 24 via the spring 12, and remains within a limit which does not risk causing squashing of or damage to the line.

During the previous phase, the relative axial movement between nut 6 and head 7/8 enables the tongue 15 to move out from the bottom of notch 21 of nut 6 and, under the urging of spring 20, to slide axially inwardly until the curved face 30 between the main body of carrier 13 and its tongue 15 comes to abut against the edge of skirt 7, as shown in FIG. 4.

The reel is then ready for casting. The angler then flicks his rod forward and simultaneously releases the push button 34. The shaft 5 returns to its driving position, as indicated by arrow F2, FIG. 5, under the action of spring 50. Nut 6 acting by its face 27 against the carrier 13, also moves rearwardly together with the cup 110. Since the pickup 14 does not protrude from cup 110, the line 24 can freely unwind from spool 4 and pass out of the reel.

The relatively large space E available at this moment between nose cone 22 and cup 110 allows the line 24 to pass out with a minimum of rubbing (and therefore braking) against the walls of the cone and cup, and therefore favorizes long casts. The rearward movement of the cup 110 is limited by the abutment of tonge 15 against front wall 28 of spool 4.

After casting, to wind in the line, the angler rotates the handle 31, which causes rotation of shaft 5, nut 6, and cup 110. At this moment, the cam 25 of spool 4 meets the lower face 29 of tongue 15 and raises it until face 29 is spaced above the bottom of notch 21. The compressed spring 12 then urges the assembly of head 7/8, carrier 13, and cup 110 into the position of FIG. 1. The pickup 14 is held once more in its outermost position and can engage with and drive the line 24 to wind it on spool 4.

The described embodiment is only given by way of example, and various modifications may be made thereto by the person skilled in the art without departing from the scope and spirit of the invention. For example, the spool could be of the axially reciprocating type, or could be provided with a drag mechanism enabling it to turn when fighting a fish.

The described reel is particularly useful for the angler seeking a simple and economic reel enabling relatively long casts, without a risk of damaging or excessive wear to the line, and with which dismantling of the reel is particularly easy.

What is claimed is:

1. In a fishing reel of the spin casting type comprising a frame, a tubular bearing secured to the frame, an angularly fixed spool disposed co-axially about the bearing, a shaft freely angularly rotatable in and axially movable along the bearing, said shaft including a rear portion and a forward portion, means acting on the rear portion of the shaft for rotationally driving the shaft, push means for axially moving the shaft from a rearward driving position to a forward casting position against the action of resilient means, a winding cup mounted at the forward portion of the shaft for rotation with the shaft, said winding cup being disposed coaxial to and at least partially surrounding the spool, a line pickup secured on a carrier radially slidably mounted on the winding cup and secured for rotation therewith, means urging the pickup from an outermost position wherein a portion thereof protrudes radially outwardly from the winding drum to a withdrawn position nested in the winding drum, an angularly fixed cam integral with the spool bearing, said cam forming means cooperating with the carrier for moving the pickup to its outermost position upon rotation of the shaft in its driving position, and a nose cone secured to the frame, said nose cone surrounding the spool, winding cup and line pickup and having a central forward line orifice, the improvement in which the forward portion of the shaft carries a support surface fixed against axial and angular movement in relation to the shaft, said support surface forming means for supporting the pickup carrier with the pickup in its outermost position, the winding cup being axially movably mounted relative to the shaft from a first position to a second position along a direction from the forward towards the rear end of the shaft, in which first position the pickup carrier is supported in the outermost position on said support surface and in which second position the pickup support is free to move to the withdrawn position, elastic means acting between the forward end of the shaft and the winding cup for urging the winding cup from the second to the first position, said winding cup being adapted to bear against and be axially stopped against forward movement by the inner surface of the nose cone as the shaft is moved from the winding position towards the casting position whereby the nose cone forms means for moving the winding cup from the first to the second position against the action of said elastic means as the shaft is moved fully into the casting position by said push means.

2. A fishing reel according to claim 1, in which said support surface is provided in a shoulder piece at the forward end of the shaft, said winding cup including an inner central cap fitted about said shoulder piece, the central cap and shoulder piece having complementary shapes adapted to allow relative axial movement but prevent relative rotation therebetween, said elastic means being coil spring disposed between a front surface of the shoulder piece and a rear surface of the central cap.

3. A fishing reel according to claim 1, in which the spool is axially fixed to the bearing, said spool being molded in one piece in plastic material about the bearing, the frame and bearing including means for removably mounting the bearing/spool assembly on the frame.

4. A fishing reel according to claim 2, in which said pickup carrier when in the withdrawn position forms means for locking the winding cup in its second position, whereby when the push means are released and the shaft returns to the winding position under the action of said resilient means, the winding cup remains spaced apart from the inner surface of the nose cone by a supplementary amount until the pickup carrier is moved to the outermost position by said cam when the shaft is rotated and thereby allows the winding cup to move to its first position.

* * * * *